US008900338B2

(12) United States Patent
Lawrence et al.

(10) Patent No.: US 8,900,338 B2
(45) Date of Patent: Dec. 2, 2014

(54) ACCESSORY CAP FOR A RESPIRATORY FILTER CARTRIDGE

(75) Inventors: Michael Lawrence, Smithfield, RI (US); Joseph Rodrigues, Cranston, RI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/568,524

(22) Filed: Aug. 7, 2012

(65) Prior Publication Data

US 2014/0041348 A1 Feb. 13, 2014

(51) Int. Cl.

| | |
|---|---|
| ***B01D 39/00*** | (2006.01) |
| ***B01D 46/00*** | (2006.01) |
| ***B01D 47/00*** | (2006.01) |
| ***B01D 53/00*** | (2006.01) |
| ***A62B 7/10*** | (2006.01) |
| ***A62B 18/02*** | (2006.01) |
| ***A62B 18/08*** | (2006.01) |
| ***A62B 31/00*** | (2006.01) |

(52) U.S. Cl.

USPC .................... 55/493; 128/201.25; 128/205.25; 128/206.12; 128/206.27; 128/206.28; 128/205.26; 128/205.27; 128/205.28; 128/205.29

(58) Field of Classification Search

USPC ............. 55/493; 128/201.25, 205.25, 206.12, 128/206.27–28, 205.26–29

See application file for complete search history.

(56) References Cited

U.S. PATENT DOCUMENTS 2,505,173 A * 4/1950 Conley ..................... 128/206.15
2,744,523 A * 5/1956 Malcom, Jr. et al. .... 128/206.17
3,142,549 A * 7/1964 Klusewitz et al. .............. 96/121
3,307,543 A * 3/1967 Silverman ................ 128/206.17
4,020,834 A 5/1977 Bird
4,179,274 A 12/1979 Moon
4,207,882 A * 6/1980 Lemere .................... 128/206.15
4,444,575 A 4/1984 Miller et al.
4,467,795 A 8/1984 Eckstein (Continued)

FOREIGN PATENT DOCUMENTS

EP 1889643 A2 2/2008
WO 2008082415 A1 7/2008

OTHER PUBLICATIONS

PCT/US2013/052045, PCT International Search Report, dated Jul. 2, 2014, 3 pages.

(Continued)

*Primary Examiner* — Amber Orlando

(74) *Attorney, Agent, or Firm* — Conley Rose, P.C; Kristin Jordan Harkins

(57) ABSTRACT

An accessory cap for a respiratory cartridge includes a housing having a front wall and a side wall which cooperate to define an interior cavity. The side wall includes a retaining formation configured and arranged to releasably engage and hold the housing on the respiratory cartridge. The housing includes a downwardly facing air passage configured to allow air to pass from an exterior environment to the interior cavity. The accessory cap further includes a pre-filter support web removably received within the interior cavity and spaced inwardly from the front wall. The housing and the pre-filter support web form a pre-filter cavity within the interior cavity adjacent to the front wall. The accessory cap can function as a standalone shower cap, or a pre-filter media can be optionally inserted into the pre-filter cavity so that the accessory cap functions as a combination pre-filter and a shower cap.

12 Claims, 3 Drawing Sheets

(56) References Cited

U.S. PATENT DOCUMENTS

| | | | | |
|---|---|---|---|---|
| 4,548,626 | A * | 10/1985 | Ackley et al. | 96/139 |
| 4,573,464 | A * | 3/1986 | Yo | 128/206.15 |
| 4,592,350 | A * | 6/1986 | Maryyanek et al. | 128/206.17 |
| 4,630,604 | A * | 12/1986 | Montesi | 128/206.15 |
| 4,686,976 | A * | 8/1987 | Bakkila et al. | 128/206.15 |
| 4,688,567 | A * | 8/1987 | Kikuchi et al. | 128/206.15 |
| 4,714,486 | A * | 12/1987 | Silverthorn | 96/134 |
| 4,818,122 | A | 4/1989 | Arbuthnot | |
| 4,850,346 | A * | 7/1989 | Michel et al. | 128/206.15 |
| 4,867,770 | A * | 9/1989 | Feeney | 96/137 |
| 4,934,361 | A * | 6/1990 | Michel et al. | 128/206.17 |
| 4,964,900 | A | 10/1990 | Thompson et al. | |
| 4,981,134 | A * | 1/1991 | Courtney | 128/207.12 |
| 5,022,901 | A * | 6/1991 | Meunier | 96/134 |
| 5,033,507 | A * | 7/1991 | Pouchot | 137/550 |
| 5,036,844 | A | 8/1991 | Pouchot et al. | |
| 5,038,775 | A * | 8/1991 | Maruscak et al. | 128/205.27 |
| 5,063,926 | A | 11/1991 | Forsgren et al. | |
| 5,222,488 | A * | 6/1993 | Forsgren | 128/201.25 |
| 5,226,412 | A * | 7/1993 | Winters | 128/206.12 |
| 5,421,048 | A | 6/1995 | Reinert, Sr. | |
| 5,511,263 | A | 4/1996 | Reinert, Sr. | |
| 5,647,356 | A * | 7/1997 | Osendorf et al. | 128/206.17 |
| 5,652,966 | A | 8/1997 | Reinert, Sr. | |
| 5,901,246 | A | 5/1999 | Hoffberg et al. | |
| 6,016,804 | A * | 1/2000 | Gleason et al. | 128/206.17 |
| 6,161,540 | A | 12/2000 | Fecteau | |
| 6,298,849 | B1 * | 10/2001 | Scholey et al. | 128/205.27 |
| 6,418,424 | B1 | 7/2002 | Hoffberg et al. | |
| 6,497,232 | B2 | 12/2002 | Fecteau et al. | |
| 6,536,435 | B1 | 3/2003 | Fecteau et al. | |
| 6,681,765 | B2 | 1/2004 | Wen | |
| 6,702,997 | B2 | 3/2004 | Chaudry et al. | |
| 6,732,733 | B1 | 5/2004 | Brostrom et al. | |
| 6,783,566 | B2 * | 8/2004 | Estkowski | 55/418 |
| 6,793,702 | B2 | 9/2004 | Eswarappa | |
| 6,827,764 | B2 | 12/2004 | Springett et al. | |
| 6,854,464 | B2 * | 2/2005 | Mukaiyama et al. | 128/206.17 |
| 7,044,993 | B1 | 5/2006 | Bolduc | |
| 7,118,608 | B2 | 10/2006 | Lovell | |
| 7,136,710 | B1 | 11/2006 | Hoffberg et al. | |
| 7,182,081 | B2 * | 2/2007 | Reisman | 128/201.22 |
| 7,419,526 | B2 * | 9/2008 | Greer et al. | 55/512 |
| 7,488,464 | B2 | 2/2009 | Hammel et al. | |
| 7,559,323 | B2 * | 7/2009 | Hacke et al. | 128/201.25 |
| 7,647,927 | B2 | 1/2010 | Teetzel et al. | |
| 7,759,968 | B1 | 7/2010 | Hussein et al. | |
| 7,789,930 | B2 | 9/2010 | Ensor et al. | |
| 8,066,005 | B2 | 11/2011 | Lin | |
| 8,113,198 | B2 | 2/2012 | Teetzel et al. | |
| 8,293,333 | B2 | 10/2012 | Croll et al. | |
| 8,342,179 | B2 * | 1/2013 | Hacke et al. | 128/206.15 |
| 8,402,966 | B2 | 3/2013 | Morgan, III et al. | |
| 8,443,806 | B2 * | 5/2013 | Morelli et al. | 128/207.12 |
| 2002/0078953 | A1 * | 6/2002 | Fecteau et al. | 128/202.27 |
| 2003/0140920 | A1 | 7/2003 | Chaudry et al. | |
| 2003/0154984 | A1 * | 8/2003 | Fernandes | 128/205.27 |
| 2003/0192537 | A1 | 10/2003 | Odell et al. | |
| 2004/0006815 | A1 | 1/2004 | Carroll et al. | |
| 2004/0079373 | A1 * | 4/2004 | Mukaiyama et al. | 128/205.27 |
| 2005/0121029 | A1 * | 6/2005 | Reisman | 128/201.22 |
| 2005/0175544 | A1 | 8/2005 | Chaudry et al. | |
| 2006/0213514 | A1 | 9/2006 | Price et al. | |
| 2006/0283453 | A1 | 12/2006 | Haddad | |
| 2007/0056586 | A1 | 3/2007 | Price et al. | |
| 2007/0061735 | A1 | 3/2007 | Hoffberg et al. | |
| 2007/0101990 | A1 * | 5/2007 | Hacke et al. | 128/201.25 |
| 2007/0151560 | A1 | 7/2007 | Price et al. | |
| 2007/0276270 | A1 | 11/2007 | Tran | |
| 2008/0001735 | A1 | 1/2008 | Tran | |
| 2008/0004904 | A1 | 1/2008 | Tran | |
| 2009/0148342 | A1 | 6/2009 | Bromberg et al. | |
| 2009/0314295 | A1 | 12/2009 | Hatmaker | |
| 2009/0318779 | A1 | 12/2009 | Tran | |
| 2010/0059428 | A1 | 3/2010 | Boren et al. | |
| 2010/0282682 | A1 | 11/2010 | Eaton et al. | |
| 2010/0295660 | A1 | 11/2010 | Brioschi et al. | |
| 2011/0001602 | A1 | 1/2011 | Brioschi et al. | |
| 2011/0115624 | A1 | 5/2011 | Tran | |
| 2011/0181422 | A1 | 7/2011 | Tran | |
| 2011/0308516 | A1 | 12/2011 | Price et al. | |
| 2012/0020832 | A1 | 1/2012 | St. Onge et al. | |
| 2012/0085349 | A1 | 4/2012 | Tobias et al. | |
| 2012/0092156 | A1 | 4/2012 | Tran | |
| 2012/0092157 | A1 | 4/2012 | Tran | |
| 2012/0125342 | A1 * | 5/2012 | Gebrewold et al. | 128/206.12 |
| 2012/0138059 | A1 | 6/2012 | Teetzel et al. | |
| 2012/0167889 | A1 * | 7/2012 | Friday et al. | 128/205.27 |
| 2012/0325221 | A1 * | 12/2012 | Tran | 128/206.17 |
| 2012/0330109 | A1 | 12/2012 | Tran | |
| 2013/0009783 | A1 | 1/2013 | Tran | |
| 2013/0071439 | A1 | 3/2013 | Losick et al. | |

OTHER PUBLICATIONS

PCT/US2013/052045, PCT Written Opinion of the International Searching Authority, dated Jul. 2, 20143, 6 pages.

* cited by examiner

ACCESSORY CAP FOR A RESPIRATORY FILTER CARTRIDGE

BACKGROUND

The instant invention relates to gas and vapor respiratory filter cartridges and more particularly to an accessory cap which functions either as a standalone shower cap for the filter cartridge, or as a combination pre-filter housing and a shower cap.

SUMMARY

An improved accessory cap for a gas and vapor respiratory filter cartridge includes an open-ended housing having a front wall and a side wall extending rearwardly from the front wall. The front wall and side wall cooperate to define an interior cavity. The side wall includes an inwardly turned retaining lip formation which is configured and arranged to releasably engage and hold the housing on the intake end of the filter cartridge. The housing further includes a downwardly facing air passage which is configured to allow air to pass from an exterior environment to the interior cavity. In use, the downwardly facing air passage restricts liquids, such as from an emergency water shower, from entering the air passage from the front or from the top.

The accessory cap further includes a pre-filter support web pivotably connected to the housing by a living hinge. The support web is selectively pivotable into a seated position within the interior cavity where it is spaced inwardly from the front wall and forms a pre-filter cavity within the interior cavity adjacent to the front wall. The web-like structure of the support web readily allows air to pass through the housing to the intake end of the filter cartridge. To insert the pre-filter media into the pre-filter cavity, the user simply lifts the support web upwardly inserts the pre-filter media beneath the web and then pivots the web back into its normally seated position.

The accessory cap thus functions as a standalone shower cap when a pre-filter media is not inserted into the housing. Alternatively, when a pre-filter media is inserted into the pre-filter cavity, the accessory cap functions as a combination pre-filter and a shower cap.

Accordingly, it is an objective to provide a multi-function accessory cap for a respiratory filter cartridge which can function as a standalone shower cap.

It is another objective to provide a multi-function accessory cap which also functions as a combination pre-filter housing and a shower cap.

Other objects, features and advantages shall become apparent as the description thereof proceeds when considered in connection with the accompanying illustrative drawings.

DESCRIPTION OF THE DRAWINGS

An exemplary embodiment will now be described further by way of example with reference to the following figures which are intended to be illustrative only and in no way limiting upon the scope of the disclosure.

DETAILED DESCRIPTION OF AN EXEMPLARY EMBODIMENT

Figure 1:
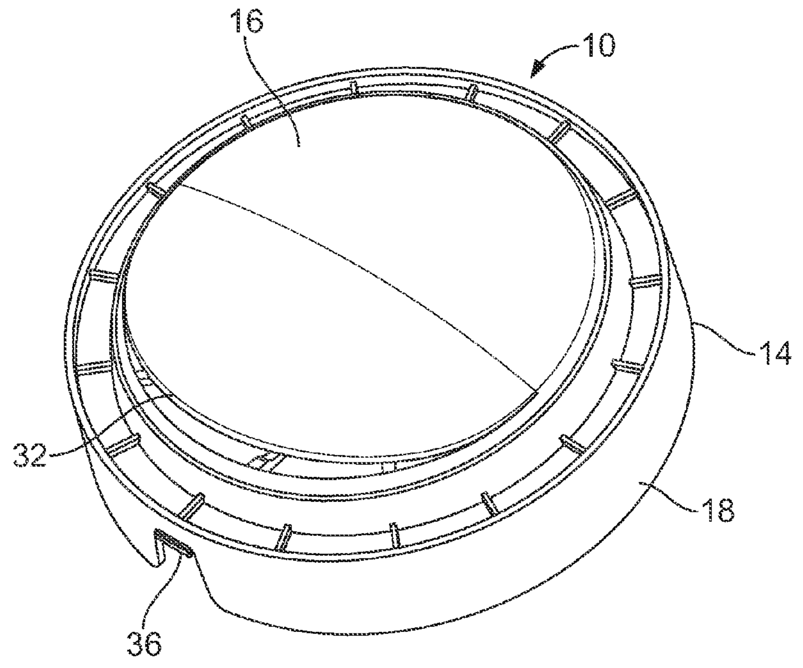
FIG. 1 is a perspective view of the present accessory cap.
Figure 2:
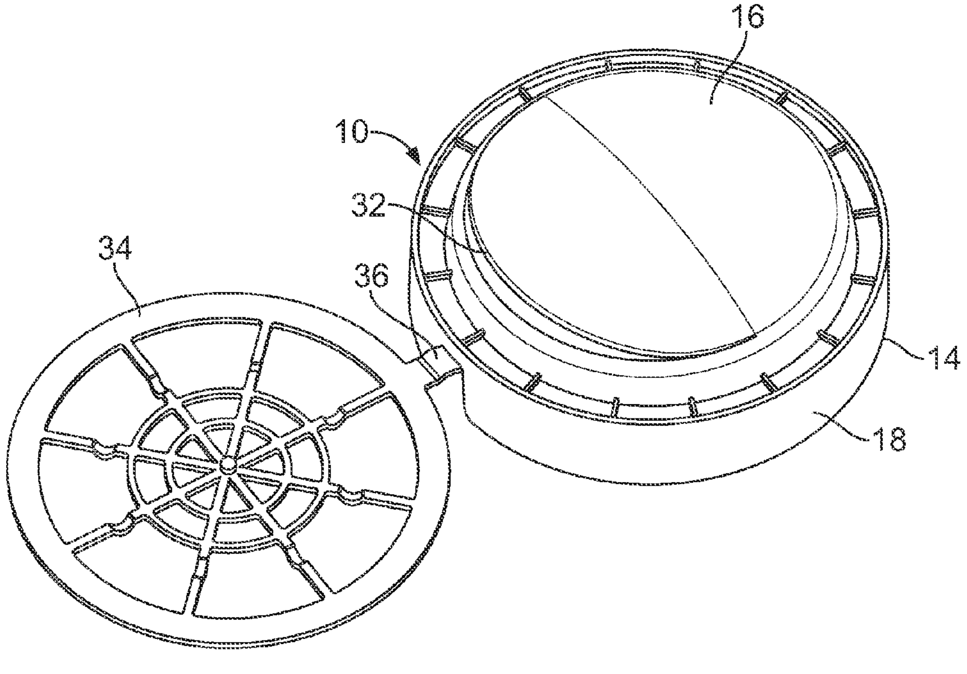
FIG. 2 is another perspective view thereof.

Referring to FIGS. 1-7, an improved accessory cap 10 for a gas and vapor respiratory filter cartridge 12 generally includes an open-ended housing 14 having a front wall 16 and a side wall 18 extending rearwardly from a peripheral edge of the front wall 16.

Figure 6:
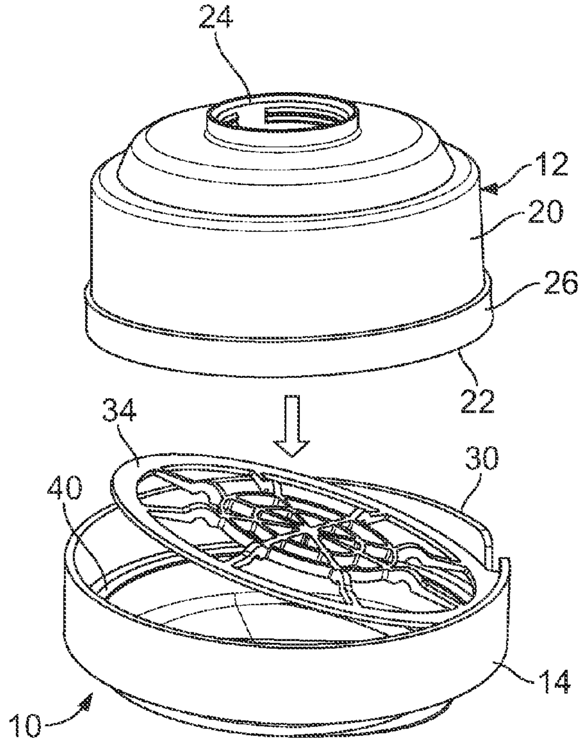
FIG. 6 is a perspective view thereof illustrating use of the accessory cap as a shower cap.
Figure 7:
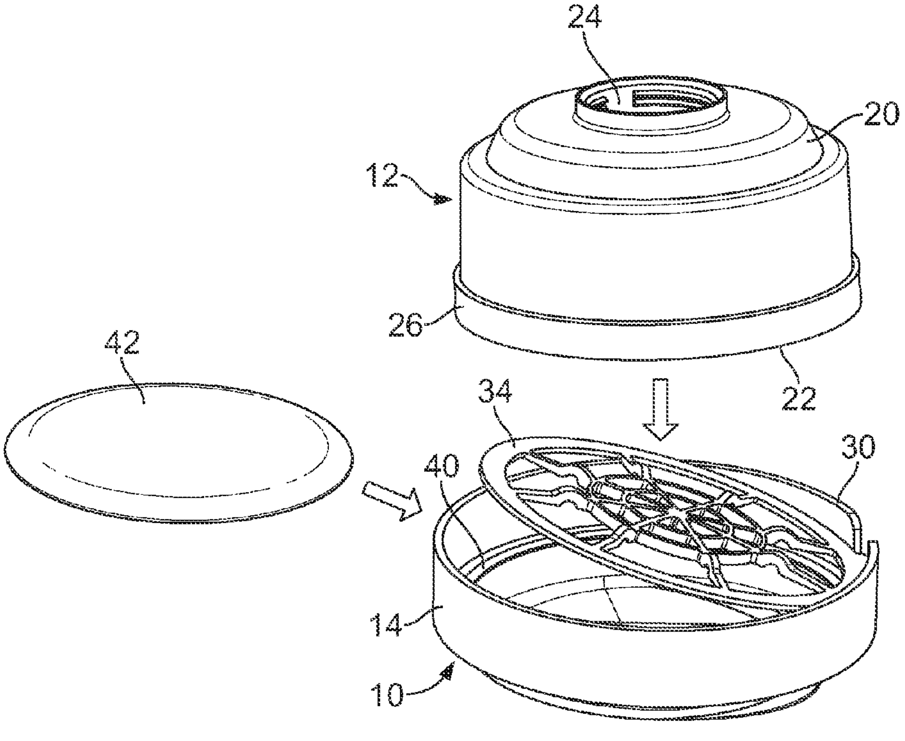
FIG. 7 is another perspective view thereof illustrating use of the accessory cap as a pre-filter housing.

Turning briefly to FIGS. 6 and 7, the gas and vapor respiratory cartridge 12 is known in the art, and generally includes a filter body 20 having an intake end 22 and a connection end 24 where is it connected to a respiratory mask (not shown). As can be seen in the drawings, a cover portion 26 of the cartridge 12 overlaps the side wall of the body 20 creating a shoulder onto which the accessory cap 10 will mount, as will be described further hereinbelow.

The front wall 16 and side wall 18 cooperate to define an interior cavity 28 into which the respiratory cartridge 12 is inserted. The side wall 18 includes an inwardly turned retaining lip formation 30 which is configured and arranged to releasably engage and hold the housing 14 on the intake end 22 of the filter cartridge 12 (FIGS. 6 and 7). Retaining lip 30 is snap received over the shoulder created by cover 26.

Figure 3:
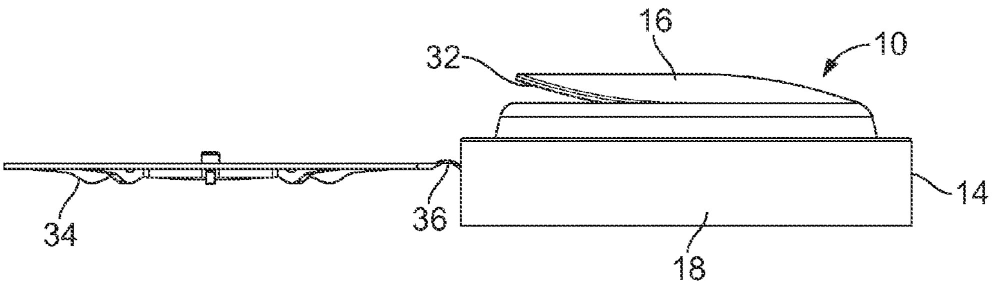
FIG. 3 is a side view thereof.
Figure 4:
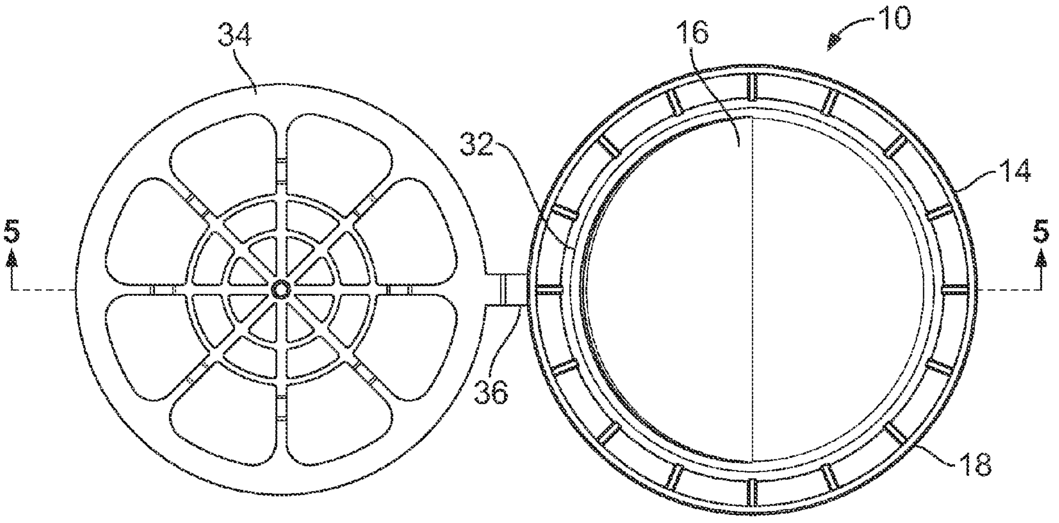
FIG. 4 is a top view thereof.
Figure 5:
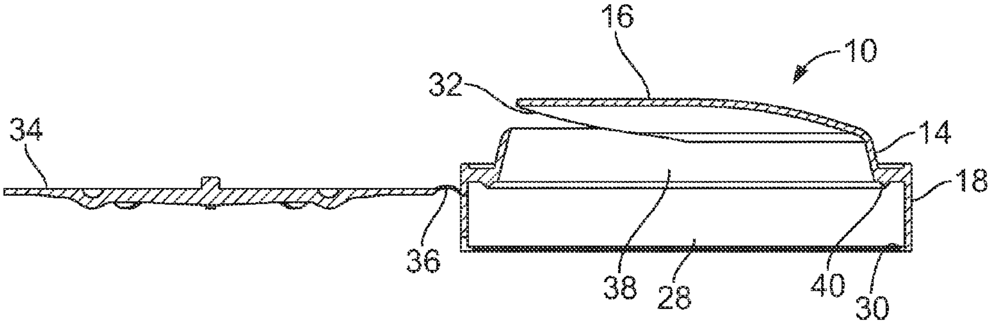
FIG. 5 is a cross-sectional view thereof as taken along line 5-5 of FIG. 4.

As best seen in FIGS. 1, 3 and 5, the housing 14 further includes a downwardly facing air passage 32 which is configured to allow air to pass from an exterior environment to the interior cavity 28. In use, the downward orientation of the air passage 32 restricts liquids, such as might be encountered in an emergency water shower, from entering the air passage 32 from the front or from the top. It is noted that when the housing 14 is snap received onto the filter cartridge 12, it is received in a friction fit and is rotatable relative to the filter cartridge 12. When installed, the user must rotate the housing 14 to the desired orientation so that the air passage 32 faces downwardly to achieve the desired function. The friction fit is sufficient that the housing 14 will normally stay in position once rotated to the proper orientation.

The accessory cap 10 further includes a pre-filter support web 34 pivotably connected to the housing by a living hinge 36. The support web 34 is selectively pivotable into a seated position (See FIGS. 6 and 7) within the interior cavity 28 where it rests against a stepped shoulder 40 of the side wall 18 and is spaced inwardly from the front wall 16 forming a pre-filter cavity 38 within the interior cavity 28 adjacent to the front wall 16. It is noted that the support web 34 is not illustrated in its fully seated position in FIGS. 6 and 7, and it should be understood that when it is fully pivoted into position it is received flat against shoulder 40. The web-like structure of the support web 34 readily allows air to pass through the housing 14 to the intake end 22 of the filter cartridge 12. To insert a pre-filter media 42 into the pre-filter cavity 38, the user simply lifts the support web 34 upwardly, inserts the pre-filter media 42 beneath the support web 34 and then pivots the support web 34 back into its normally seated position (See FIG. 7).

It should also be noted that the support web 34 need not be hinged to the housing 14. It is contemplated that the support web 34 could be provided as a separate component and simply inserted into the housing 14 with a friction fit. Connecting the support web 34 to the housing 14 with a hinge 36 retains the support web 34 with the housing 14 so that it is not lost and facilitates proper use of the cap 10.

The accessory cap 10 thus functions as a standalone shower cap when a pre-filter media 42 is not inserted into the housing 14 (FIG. 6). Alternatively, when a pre-filter media 42 is inserted into the pre-filter cavity 38 (FIG. 7), the accessory cap 10 functions as a combination pre-filter and a shower cap.

It can therefore be seen that the present disclosure provides a multi-function accessory cap for a respiratory filter cartridge which can function as a standalone shower cap. It can also be seen that the present disclosure provides a multi-function accessory cap which also functions as a combination pre-filter housing and a shower cap. For these reasons, the instant invention is believed to represent a significant advancement in the art which has substantial commercial merit.

While there is shown and described herein certain specific structure, it will be manifest to those skilled in the art that various modifications and rearrangements of the parts may be made without departing from the spirit and scope of the underlying concept and that the same is not limited to the particular forms herein shown and described except insofar as indicated by the scope of the appended claims.

What is claimed is:

1. An accessory cap for a respiratory filter cartridge comprising:

a housing including a front wall and a side wall extending rearwardly from said front wall, said front wall and said side wall cooperating to define an interior cavity, said side wall including a retaining formation configured and arranged to releasably engage the filter cartridge, said housing including an air passage configured to allow air to pass from an exterior environment to said interior cavity; and a pre-filter support web removably received within said interior cavity, said pre-filter support web being spaced inwardly from said front wall whereby a pre-filter cavity is defined within said interior cavity adjacent said front wall;

wherein said support web is pivotably connected to said housing by a living hinge; and wherein said air passage is located on a lower portion of said side wall whereby liquid is restricted from entering said air passage.

2. The accessory cap of claim 1, wherein said side wall includes an inwardly extending support shoulder, said pre-filter support web being received against said support shoulder.

3. The accessory cap of claim 1, wherein said retaining formation comprises an inwardly turned retaining lip.

4. The accessory cap of claim 1 wherein said side wall comprises an opening interacting with said living hinge to allow said support web to pivot into place within said interior cavity, and wherein said opening is covered by a portion of the filter cartridge when said retaining formation of said side wall of said cap engages the filter cartridge.

5. The accessory cap of claim 3 wherein said accessory cap releasably engages the filter cartridge with said inwardly turned retaining lip snap friction fit onto a shoulder of the filter cartridge, and wherein said releasably engaged accessory cap is rotatable relative to the filter cartridge allowing orientation of said air passage into a downwardly facing position.

6. The accessory cap of claim 5 wherein the snap friction fit between said accessory cap and the filter cartridge is sufficient to hold the rotational orientation of said air passage.

7. The accessory cap of claim 1 wherein said support web is located within said interior cavity spaced inwardly from said front wall, and wherein a portion of said interior cavity between said front wall and said support web forms the pre-filter cavity configured to receive pre-filter media.

8. The accessory cap of claim 7 wherein said interior cavity comprises a stepped shoulder, and wherein said support web is received flat against the stepped shoulder within said interior cavity of said cap housing.

9. The accessory cap of claim 8 further comprising pre-filter media located within said pre-filter cavity between said front wall and said support web.

10. A respiratory filter for removable attachment to a respirator mask, comprising: a filter cartridge having a filter body housing with an intake end, a connection end, and a mounting shoulder; and an accessory cap comprising: a housing including a front wall and a side wall extending rearwardly from said front wall, said front wall and said side wall cooperating to define an interior cavity, said side wall including a retaining formation configured and arranged to releasably engage said mounting shoulder of said filter cartridge, said housing including an air passage configured to allow air to pass from an exterior environment to said interior cavity, wherein said air passage is located on a lower portion of said side wall whereby liquid is restricted from entering said air passage; and a pre-filter support web removably received within said interior cavity, said pre-filter support web being spaced inwardly from said front wall whereby a pre-filter cavity is defined within said interior cavity adjacent said front wall; wherein said support web is pivotably connected to said housing by a living hinge.

11. The respiratory filter of claim 10 wherein said accessory cap releasably engages and attaches to said intake end of said filter cartridge and is rotatable relative to said intake end of said filter cartridge, allowing orientation of said air passage into a downwardly facing position relative to said cartridge on the respirator mask.

12. The respiratory filter of claim 11 wherein said retaining formation is an inwardly turned lip configured to snap friction fit onto said mounting shoulder of said filter cartridge.

* * * * *